No. 728,655. PATENTED MAY 19, 1903.
E. M. BARNES.
DEVICE FOR PROJECTING IMAGES.
APPLICATION FILED NOV. 15, 1900.
NO MODEL. 3 SHEETS—SHEET 1.
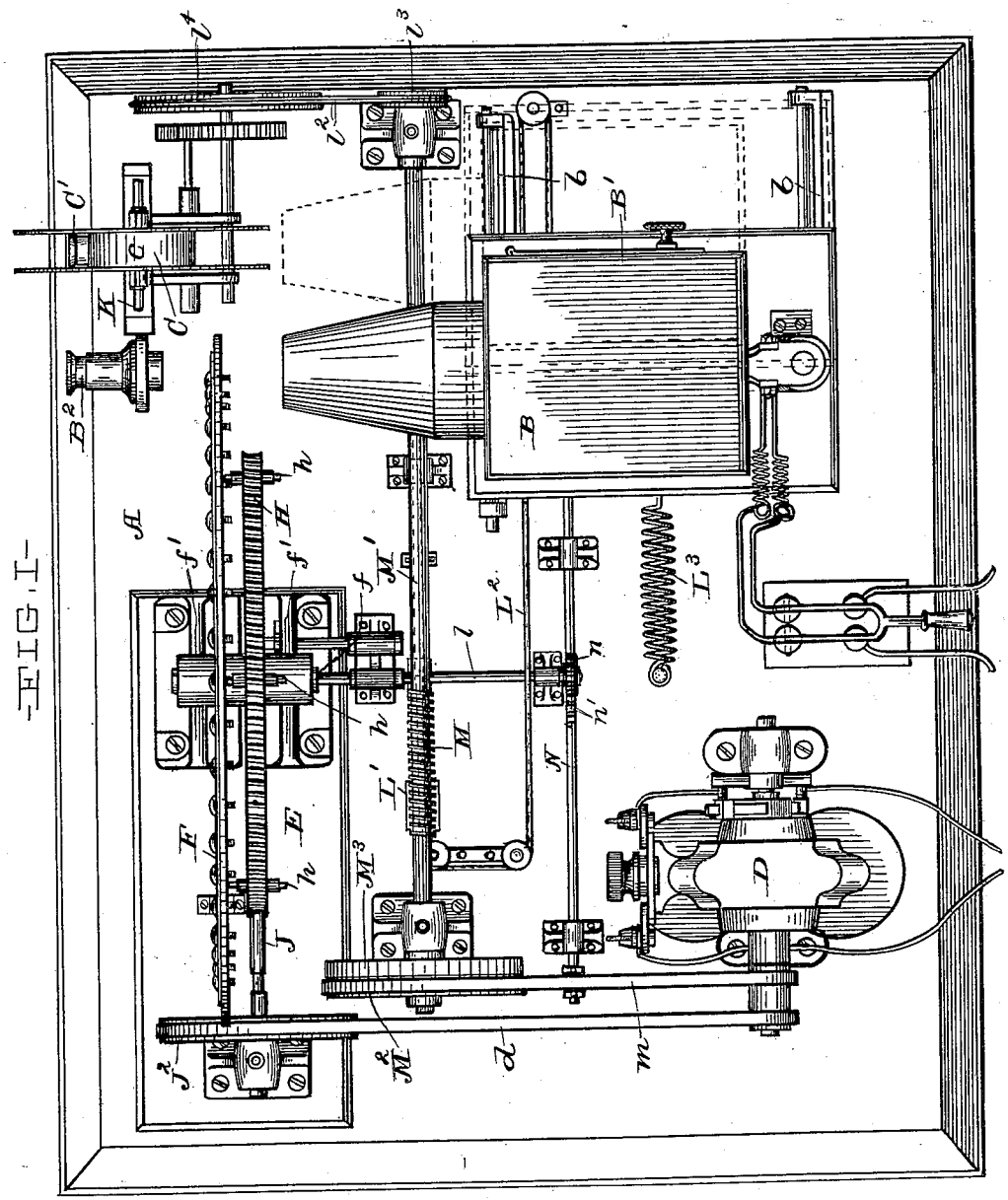

No. 728,655. PATENTED MAY 19, 1903.
E. M. BARNES.
DEVICE FOR PROJECTING IMAGES.
APPLICATION FILED NOV. 15, 1900.
NO MODEL. 3 SHEETS—SHEET 2.
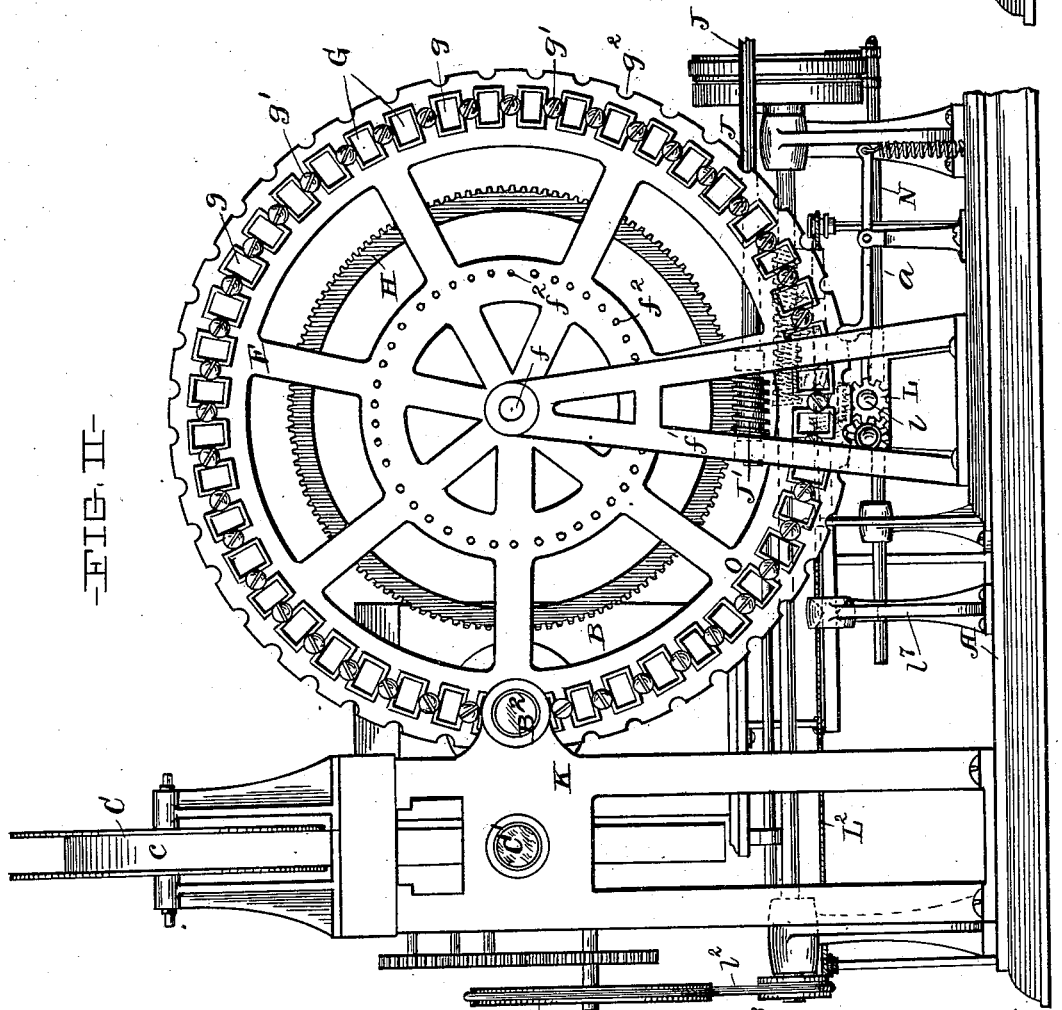

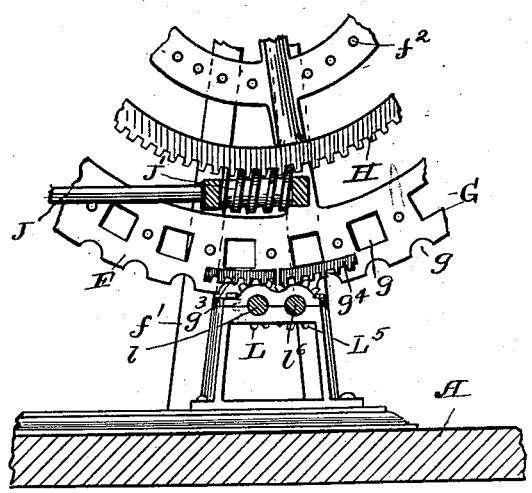
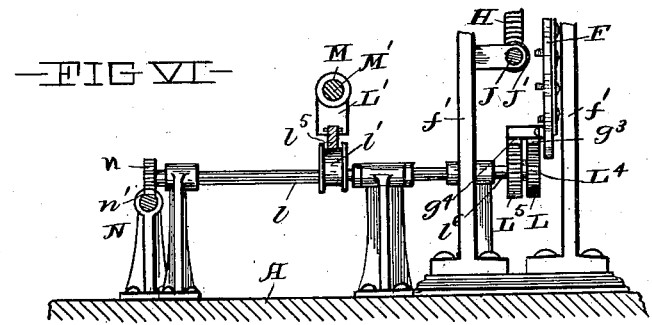
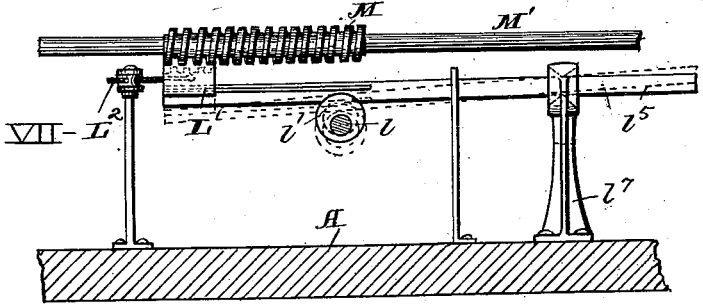
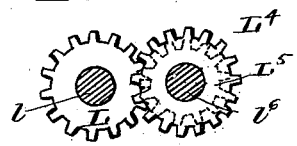

No. 728,655. Patented May 19, 1903.

UNITED STATES PATENT OFFICE.

EDWARD M. BARNES, OF CLEVELAND, OHIO, ASSIGNOR TO THE ADOSCOPE ADVERTISING COMPANY, OF CLEVELAND, OHIO, A CORPORATION OF OHIO.

DEVICE FOR PROJECTING IMAGES.

SPECIFICATION forming part of Letters Patent No. 728,655, dated May 19, 1903.

Application filed November 15, 1900. Serial No. 36,553. (No model.)

*To all whom it may concern:*

Be it known that I, EDWARD M. BARNES, a citizen of the United States, and a resident of Cleveland, county of Cuyahoga, and State of Ohio, have invented a new and useful Improvement in Devices for Projecting Images, of which the following is a specification, the principle of the invention being herein explained and the best mode in which I have contemplated applying that principle so as to distinguish it from other inventions.

My invention relates to devices for projecting images upon a screen; and it consists of means hereinafter fully described.

The annexed drawings and the following description set forth in detail certain means embodying the invention, such disclosed means constituting but one of various forms in which the principle of the invention may be used.

Figure I represents a top plan, Fig. II a partial front elevation, and Fig. III an end view, of an image-projecting device embodying my invention. Figs. IV, V, VI, VII, and VIII represent detail views.

Upon a suitable frame A, Fig. I, are mounted a stereopticon B, a moving-picture device C, a motor D, and mechanism E, comprising means hereinafter described for supplying transparencies to the stereopticon. Mechanism E consists of a rotatable disk F, mounted upon a suitable shaft $f$, supported in upright standards $f'$, as shown in Figs. I and II. Near the periphery of said disk are provided a series of apertures $g$, Fig. V, equidistant from the shaft-axis, each of which is adapted to receive a transparency-slide G, which may be removably secured therein by means of clamping-screws $g'$. Mounted upon said shaft adjacent to said disk is a worm-wheel H, rotatable upon said shaft independently of said disk. Near the periphery of said wheel and projecting laterally therefrom in the direction of the disk are four spring-dogs $h$, equidistant from the shaft-axis. Opposite the circumference described by the axes of said dogs during their rotation about the shaft $f$ are a series of recesses $f^2$, formed in the disk F, equal in number to the number of apertures $g$ and separated from each other by angular distances corresponding with those separating said apertures $g$. Each of said dogs is adapted upon being projected toward said disk to engage any recess $f^2$ in the line of its projection and projects in the opposite direction from the wheel, as shown in Fig. III. Upon the rear standard $f'$ is secured a cam $f^3$, located and projecting into the path of the rear end of said dog, as shown in said Fig. III. The form of such cam is such as to cause said dogs on engaging said cam during its rotation with the wheel H to engage one of the recesses $f^2$. A spring-pawl $a$, secured to the frame A, Fig. II, engages successively a series of notches $g^2$, formed in the periphery of disk F, so as to punctuate and secure the successive positions of the latter, whereby proper alinement of the dogs and recesses $f^2$ may be obtained. Said wheel H is positively driven by a worm $J'$, mounted upon a driving-shaft J, upon whose outer extremity is secured a driving-pulley $J^2$, Fig. I, driven by the suitable motor D and belt $d$.

The stereopticon B comprises a suitable lamp mounted in a housing $B'$ and a lens $B^2$, mounted upon a support K, the disk F being so located as to permit the apertures $g$ and transparencies mounted therein to pass through the field of the stereopticon—that is, intermediately of the lens in the housing and the lens $B^2$—whereby images upon such transparencies may be projected upon a suitable screen, (not shown,) as is readily understood. Said housing is slidably mounted upon guideways $b$, Fig. I, by means of which it may be moved from opposite lens $B^2$ opposite the lens $C'$ in the moving-picture device C and the lamp utilized to project the pictures upon the film $c$ of such device, the latter being angularly arranged, so as to project such images upon the screen aforementioned. Such movement of the lamp-housing may be accomplished by the following means, such means being, however, but one of various forms which may be utilized for such purpose. A pinion L is secured to a shaft $l$, Fig. II, to which is secured a cam $l'$, Figs. VI and VII. Said cam engages a lever $l^5$, fulcrumed upon standard $l^7$, Fig. VII, upon which lever is slidably mounted a half-nut $L'$, which is adapted to engage a screw M, Fig. I, secured upon a driving-shaft M', which drives the moving-picture device by a suitable belt $l^2$ and pulleys $l^3$ and $l^4$, Fig. I. Such nut is caused to rest when out of engagement with said screw at the extreme end of the lever $l^5$ by gravity, the position of said lever at such time being downwardly inclined, as shown in dotted lines in said Fig. VII. A chain $L^2$ is secured to said nut and to the lamp-housing in a manner such as to pull the latter opposite the moving-picture device when the nut is moved toward the shaft $l$. The disk F is provided upon its inner peripheral portion with a gear-segment $g^3$, which is adapted to engage pinion L and impart a half-turn to the shaft $l$. A second segment $g^4$, projecting beyond segment $g^3$, as shown in Figs. III and VI, is adapted to engage a pinion $L^4$, Figs. V and VIII, which is secured to a shaft $l^6$, mounted parallel with and contiguous to shaft $l$. A pinion $L^5$, secured to said shaft and of smaller diameter than the pinion L, engages the latter. Segment $g^4$ is of a length somewhat longer than segment $g^3$, so that the movement derived from segment $g^4$ may equal that derived from segment $g^3$, such increased length being necessitated by virtue of the difference in diameter of pinions $L^5$ and $L^4$, as is readily understood. A spring $L^3$ is secured to the frame and lamp-housing and tends to draw the latter opposite lens $B^2$. One end of shaft M' is provided with a driving-pulley $M^2$ and idle pulley $M^3$, a belt $m$ from the motor being adapted to drive either the one or the other, according to its position. During the projection of the slides upon the screen said belt $m$ is permitted to engage the idle pulley $M^3$. The inner end of shaft $l$ is provided with a pinion $n$, Figs. I and VI, which engages a rack $n'$, formed or secured upon belt-shafting rod N, adapted to shift belt $m$ from the idle pulley $M^3$ onto driving-pulley $M^2$, or vice versa.

The operation of the above-described device is as follows: Assuming the positions of the various parts to be those illustrated, the motor and the intermediate gearing rotates the worm-wheel H continuously. Four times during each revolution of said wheel a spring-dog $h$ encounters the cam $f^3$, which causes such dog to engage a recess $f^2$, thereby causing disk F to rotate with said wheel during such engagement an angular distance equal to that between the centers of contiguous apertures $g$. Upon the recession of said cam the dog $h$ is released from said disk and the latter again becomes stationary, its movement being punctuated by the pawl $a$. The disk is thereby intermittently and partially rotated, so as to automatically bring each transparency into the field of the stereopticon in succession. Once during each complete revolution of the disk the gear-segment $g^3$ operates the belt-shifter so as to effect the rotation of driving-shaft M', thereby operating the moving picture device, cam $l'$ simultaneously engaging lever $l^5$, so as to effect the engagement of the nut L' and screw M, the shifting of the lamp and housing opposite the said picture device resulting from such operation, and simultaneously distending spring $L^3$, the picture images being thereby substituted for the transparency images upon the screen. Upon the completion of the operation of said picture-machine gear-segment $g^3$ releases the pinion L and gear-segment $g^4$ engages the train of gears L, $L^4$, and $L^5$, thereby shifting the belt back upon the idle pulley $M^3$ and causing the cessation of the operation of the moving-picture device. Upon the release of the pinion $L^4$, resulting from the continued rotation of the disk F, spring $L^3$ becomes free to act and returns the lamp and housing to their original positions. The rotation of the gear-train also permits the lever $l^5$ to drop, so as to permit of the disengagement of nut L' and screw M. Since the apertures $f^2$ are equidistant from each other, it is seen that the intermittent movements of the disk are of equal length. The segment $g^4$ therefore would not entirely disengage the pinion $L^4$, and a complete half-revolution of the latter would hence not be had. Such half-revolution is, however, completed during the initial part of the next intermittent disk movement, whereby the lever $l^5$ and pinion are brought back into proper position for reëngagement by segment $g^3$. Such operation of the picture device and shifting of the lamp and housing may be caused to occur one or more times during one complete rotation of the disk F, such number depending upon the number of gear-segments provided, as is readily understood.

Other modes of applying the principle of my invention may be employed instead of the one explained, change being made as regards the means herein disclosed provided the means stated by any one of the following claims or the equivalent of such stated means be employed.

I therefore particularly point out and distinctly claim as my invention—

1. The combination in a unitary structure of a stereopticon, a series of transparencies, means for successively bringing such transparencies into the field of the stereopticon, a moving-picture device and means for operating such device intermediately of the projection of two successive transparency images.

2. The combination in a unitary structure, of a stereopicon, a series of transparencies, means for successively bringing such transparencies into the field of the stereopticon, a moving-picture device, a motor for operating said transparencies and operating means, and means for periodically connecting such picture device with said motor and disconnecting such motor from said transparency-operating means.

3. In a device for throwing images upon a screen, the combination of a rotatable disk provided with a series of transparencies secured circumferentially near its periphery, driving means, a rotatable wheel positively connected with the latter, and rotatable independently of said disk, said wheel provided with a spring-dog, and means for periodically actuating said dog to engage and disengage said disk whereby the latter may be caused to periodically and partially rotate.

4. In a device for throwing images upon a screen, the combination of a rotatable disk provided with a series of circumferentially-arranged transparencies and with a series of recesses, driving means, a rotatable wheel positively connected with said driving means, said wheel provided with a spring-dog, and a cam located in the path of said dog, whereby the latter is periodically caused to engage said disk in one of said recesses and said disk caused to periodically and partially rotate, said dog adapted to release said disk on the recession of said cam.

Signed by me this 20th day of October, 1900.

EDWARD M. BARNES.

Attest:
GEO. WM. SAYWELL,
A. E. MERKEL.